United States Patent [19]

Binder et al.

[11] Patent Number: 5,244,927
[45] Date of Patent: Sep. 14, 1993

[54] LOW DENSITY STYRENE POLYMER FOAMS AND PROCESS FOR PREPARING SAME

[75] Inventors: Tomas I. Binder, Buehl-Moos, Fed. Rep. of Germany; Chau Van Vo, Souffelweyersheim, France; Deborah L. Kocsis, Newark, Ohio

[73] Assignee: The Dow Chemical Company, Midland, Mich.

[21] Appl. No.: 895,953

[22] Filed: Jun. 9, 1992

[51] Int. Cl.⁵ ............................. C08J 9/08; C08J 9/12; C08J 9/14
[52] U.S. Cl. ........................................ 521/79; 521/82; 521/88; 521/97; 521/146; 521/910
[58] Field of Search ..................... 521/79, 82, 88, 97, 521/146, 910

[56] References Cited

U.S. PATENT DOCUMENTS

| | | |
|---|---|---|
| 4,344,710 | 8/1982 | Johnson et al. .................. 366/76 |
| 4,424,287 | 1/1984 | Johnson et al. .................. 521/74 |
| 4,464,484 | 8/1984 | Yoshimura et al. .............. 521/58 |
| 4,980,388 | 12/1990 | Herrington et al. ............. 521/130 |
| 5,189,071 | 2/1993 | Rhodes et al. ................... 521/79 |
| 5,189,072 | 2/1993 | Rhodes et al. ................... 521/79 |

FOREIGN PATENT DOCUMENTS

| | | |
|---|---|---|
| 0463736 | 5/1991 | European Pat. Off. . |
| 0464581 | 6/1991 | European Pat. Off. . |
| 52-117957 | 3/1976 | Japan . |
| 1230992 | 10/1968 | United Kingdom . |

*Primary Examiner*—Morton Foelak

[57] ABSTRACT

Low density styrene polymer foams having highly desirable physical properties are prepared employing as a blowing agent a mixture of carbon dioxide, lower alcohol and water. The cell size can be effectively controlled by controlling the amount of water in the blowing agent mixture, i.e., small cell or large cell foams can be prepared. A process for preparing such foams is also disclosed.

8 Claims, No Drawings

LOW DENSITY STYRENE POLYMER FOAMS AND PROCESS FOR PREPARING SAME

BACKGROUND OF THE INVENTION

The present invention refers to polymer foams, more particularly to low density aromatic polymer foams prepared using a mixture of halogen-free blowing agents and to a process for preparing same.

Styrene polymer foams are widely used in the fields of construction, civil engineering and thermal insulation. The styrene polymer foam suitable for such applications desirably has relatively small cells and dimensional stability. These foams are the so-called extruded foams. Extruded foams are also employed in the so-called decorative field wherein a foam plank may be cut into a decorative foam and be used as is or used as a base for further decorative material. Particularly desirable stable styrene polymer foam is obtained employing the method set forth in U.S. Pat. No. 3,960,792 to M. Nakamura.

Extruded foams and their manufacture are discussed in U.S. Pat. Nos. 2,409,910; 2,515,250; 2,669,751; 2,848,428; 2,928,130; 3,121,130; 3,121,911; 3,770,688; 3,815,674; 3,960,792; 3,966,381; 4,085,073; 4,146,563; 4,229,396; 4,312,910; 4,421,866; 4,438,224; 4,454,086 and 4,486,550. For a considerable period of time, styrene polymer foams have been extruded employing a variety of organic blowing agents, such as chlorofluorocarbons (CFC's), chlorofluorohydrocarbons HCFC's and other halogenated hydrocarbons as well as mixtures thereof. An alternative blowing agent system utilizing carbon dioxide and an alkane is set forth in U.S. Pat. Nos. 4,344,710 and 4,424,287; the teachings of which are incorporated herein by reference.

Due to increased environmental concerns about ozone depletion, green house effects and air quality in general, large efforts are being made to replace CFC's, HCFC's and other halogenated hydrocarbons currently used as blowing agents in the foam industry with environmentally more acceptable blowing agents.

It remains highly desirable to provide a process for preparing a low density aromatic polymer foam using a halogen-free blowing agent. Furthermore, it also would be highly desirable to provide a low density aromatic polymer foam prepared using a halogen-free blowing agent.

SUMMARY OF THE INVENTION

Accordingly, in a first aspect, the present invention is a low density alkenyl aromatic thermoplastic foam having a plurality of closed cells having an average cell size of at least about 0.1 millimeter and containing a mixture of carbon dioxide, lower alcohol and water.

In a second aspect, the present invention is a process for preparing a low density closed cell foam comprising a plurality of closed cells having an average cell size of at least about 0.1 millimeter, the process comprising the steps of heat plastifying an alkenyl aromatic thermoplastic material; mixing from about 3 to about 10 weight percent, based on the total weight of the polymer, of a halogen-free blowing agent mixture of from about 15 to about 95 weight percent of carbon dioxide, from about 3 to about 80 weight percent of a lower alcohol and from about 0.4 to about 45 weight percent of water, based on the total weight of the total blowing agent mixture with the alkenyl aromatic thermoplastic material; reducing the pressure on the mixture to form a foam.

Of particular interest are embodiments of this invention in which the blowing agent is a mixture of from about 15 to about 95 weight percent of carbon dioxide, from about 3 to about 80 weight percent of ethanol and from about 0.4 to about 45 weight percent of water, based on the total weight of the total blowing agent mixture.

A particularly surprising result in the practice of the present invention is that the cell size can be effectively controlled by controlling the amount of water in the blowing agent mixture, with increasing amounts of water providing foams exhibiting larger average cell sizes. Thus, depending on the intended end-use application for these foams, the present invention provides foams exhibiting small or large cell sizes by varying the amounts of water in the blowing agent mixture.

Excellent skin quality and large cross-section can also be obtained when the cell size of the foam is small i.e., less than about 1.2 millimeters (mm).

DETAILED DESCRIPTION OF THE INVENTION

The alkenyl aromatic thermoplastic foams of the present invention having closed cells exhibiting a small cell size are herein also referred to as "small cell foam". At the same token, the aromatic polymer foams of the present invention having closed cells exhibiting a large cell size are herein also referred to as "large cell foam". For purposes of the present invention, the term "low density" is meant to include foam densities of from about 16 kg/m$^3$ (1 pound per cubic foot (pcf)) to about 80 kg/m$^3$ (5 pcf).

In one embodiment of the present invention, the alkenyl aromatic thermoplastic foam exhibits closed cells having a small cell size. For purposes of this invention, the term "small cell size" is meant to include cell sizes of from about 0.1 to about 1.2 mm. Advantageously, this small cell foam has at least from about 97 to about 99.9 percent, preferably from about 98.5 to about 99.8 percent, of closed gas-containing cells therein. The small cell foam preferably has cells having an average cell size of from about 0.1 to 1.1 mm and more preferably from about 0.1 to 0.9 mm, is of a generally uniform cellular structure, and without discontinuities. Furthermore, in a preferred embodiment of the present invention, the small cell foam has no substantial variation in average cell size when cell size is measured by averaging cell diameter across the minimum cross-sectional dimension of the body (i.e., such as by ASTM Method D2842-69), and has a cross-sectional area of at least about 50 cm$^2$ (8 square inches, (in$^2$)) and a minimum cross-sectional dimension of at least 0.6 cm (0.25 inch, (in)), and the small cell foam has a density of from about 16 kg/m$^3$ to about 80 kg/m$^3$ (1 to 5 pcf), preferably from about 29 kg/m$^3$ to about 50 kg/m$^3$ (1.8–3.1 pcf).

In another embodiment of the present invention, the alkenyl aromatic thermoplastic foam of the present invention exhibits closed cells having a large cell size. For purposes of this invention, the term "large cell size" is meant to include cell sizes of from greater than 1.2 to 3.0 mm. Advantageously, this large cell foam has at least from about 97 to about 99.9 percent, preferably from about 98.5 to about 99.8 percent, of closed gas-containing cells therein. The large cell foam preferably has cells having an average cell size of from 1.5 to 2.6 mm, and most preferably from about 1.6 to 2.4 mm.

Furthermore, in a preferred embodiment of the present invention, the large cell foam has a cross-sectional area of at least about 50 cm$^2$ (8 in$^2$) and a minimum cross-sectional dimension of at least 0.6 cm (0.25 in), and the large cell foam has a density of from about 16 kg/m$^3$ to about 80 kg/m$^3$ (1 to 5 pcf), preferably from about 25.6 kg/m$^3$ to about 32 kg/m$^3$ (1.6-2.0 pcf).

By the term "alkenyl aromatic thermoplastic material" is meant a solid polymer of at least one polymerizable alkenyl aromatic compound. While the amount of alkenyl aromatic compound in the polymer or copolymer may vary depending on the end-use application and the desired properties of the foam, it is generally used in an amount of at least 70 percent by weight of at least one alkenyl aromatic compound having the general formula

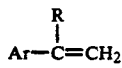

wherein Ar represents an aromatic hydrocarbon radical, or an aromatic halo-hydrocarbon radical of the benzene series, and R is hydrogen or a methyl radical. Examples of such alkenyl aromatic resins are the solid homopolymer of styrene, α-methylstyrene, o-methylstyrene, m-methylstyrene, p-methylstyrene, arethylstryene, ar-vinylxylene, ar-chlorostyrene or arbromostyrene; the solid copolymers of two or more of such alkenyl aromatic compounds with minor amounts of other readily polymerizable olefinic compounds such as methylmethacrylate, acrylonitrile, maleic anhydride, citraconic anhydride, itaconic anhydride, acrylic acid, rubber reinforced (either natural or synthetic) styrene polymers, etc.

Blowing agents useful in the practice of the present invention may be of commercial purity. The blowing agent useful in this invention is a mixture of carbon dioxide, a lower alcohol and water. By the term "lower alcohol" is meant any $C_1$-$C_6$ alcohol, preferably a $C_1$-$C_4$ alcohol. Representative lower alcohols include, for example, methanol, ethanol, iso-propanol, propanol, butanol, pentanol, hexanol, and isomers thereof, with ethanol being especially preferred.

In the practice of the present invention, if it is desired to prepare a small cell foam, carbon dioxide is generally employed in the proportions of from about 15 to about 95 weight percent, preferably from about 30 to about 90 weight percent, most preferably from about 40 to about 90 weight percent of total blowing agent whereas the lower alcohol is employed at a level of about 3 to about 80 weight percent, preferably at a level of about 6 to about 60 weight percent of the total weight of the total blowing agent mixture and the water is employed from about 0.4 to about 20 weight percent, preferably at a level of about 0.4 to about 10 weight percent, most preferably from about 0.4 to about 3 weight percent of the total weight of the total blowing agent mixture.

If it is desired to prepare a large cell foam carbon dioxide is preferably employed at a level of from about 15 to about 50 weight percent, preferably from about 26 to 43 weight percent, the lower alcohol at a level of from about 10 to about 80 weight percent, preferably from about 22 to 53 weight percent, and the water at a level of from about 10 to about 45 weight percent, preferably from about 21 to 35 weight percent.

In preparing either a small or large cell foam, the blowing agent mixture may be supplied to the alkenyl aromatic resin in any conventional manner. For example, a mixture of the desired composition of blowing agent may be directly injected into a heat plastifying and mixing apparatus such as an extruder, and the components of the mixture may be separately injected into the heat plastified resin.

For purposes of the present invention, it should be noted that the amounts of water in the blowing agent mixture, as hereinbefore defined, are based on anhydrous alcohol ("dry alcohol"). Thus, if alcohol less than 99.9 percent alcohol ("wet alcohol") is used, the amount of water contained in the alcohol should be subtracted from the defined proportions and, if necessary, supplemented with additional water in order to satisfy the required amounts of water.

In the preparation of alkenyl aromatic thermoplastic polymer foams in accordance with the present invention is most conveniently done in a manner generally as shown and described in U.S. Pat. No. 2,669,751, wherein the blowing agent is injected into a heat-plastified polymer stream within an extruder. From the extruder the heat-plastified gel is passed into a mixer, the mixer being a rotary mixer wherein a studded rotor is enclosed within a housing which has a studded internal surface which intermeshes with the studs on the rotor. The heat-plastified gel from the extruder is fed into the inlet end of the mixer and discharged from the outlet end, the flow being in a generally axial direction. From the mixer, the gel passes through coolers such as are described in U.S. Pat. No. 2,669,751 and from the coolers to a die which extrudes a generally rectangular board. A generally similar extrusion system and a preferred extrusion system is shown in U.S. Pat. No. 3,966,381.

Generally, the blowing agent mixture is pumped into the heat plastified alkenyl aromatic resin and admixed therewith prior to expansion to form foam. The blowing agent may be admixed and pumped as a combination stream into the heat plastified resin, or they may be supplied as separate streams. Adequate mixing of the blowing agents into the heat plastified resin is required in order to obtain a product of desirable uniformity. Such mixing may be accomplished by a variety of means including rotary mixers such as extruders, so-called static mixers or interfacial surface generators, such as are utilized in U.S. Pat. Nos. 3,751,377 and 3,817,669.

In the preparation of foams in accordance with the present invention, it is often desirable to add a nucleating agent to reduce the cell size. Talc, magnesium oxide, calcium-silicate, calcium stearate, and the like are suitable nucleating agents which reduce cell size. Various other additives may be utilized such as, for example, fire retardant chemicals, stabilizers and the like, all of which are commonly used in foam preparation.

The foams prepared in the present invention can be used in numerous applications. Particularly, the foams of the present invention are suitable for use in the fields of construction, civil engineering and thermal insulation in general, as well as flotation (buoyancy) billets, for decorative purposes including floral/craft billets, and the like.

ILLUSTRATIVE EMBODIMENTS

The following examples are given to illustrate the invention and should not be interpreted as limiting it in any way. Unless stated otherwise, all parts and percentages are given by weight.

EXAMPLES 1-6

Small cell styrene polymer foams are prepared according to the process of the present invention, utilizing a 2 inch diameter extruder which feeds a rotary mixer. The rotary mixer discharge is passed through three heat exchangers. The discharge from the heat exchangers is in turn passed through a plurality of interfacial surface generators or static mixers. The discharge from the static mixers is passed to a slot die. Foam is discharged from the slot die at a rate of about 60 kg/h (130 pounds per hour). Small cell foams with varying amounts of water in the blowing agent mixture are prepared in accordance with the present invention. The compositions of each foam sample and the respective blowing agent proportions are set forth in Table I. The results of the small cell foam evaluation are given in Table II below.

COMPARATIVE EXAMPLES A-D

Foam samples (Comp. Ex. A-D) are prepared following the procedure of Example 1, except the water was omitted. The other components of the blowing agent mixture are indicated in Table I below. The results of the foam evaluation are given in Table 11 below.

TABLE I

| | SMALL CELL FOAMS | | | | |
|---|---|---|---|---|---|
| Example/Polymer Composition | PS[1], parts | Nucleating Agent[2], pph[4] | Blowing Agents, (weight percent) | | |
| | | | $CO_2$ | EtOH[3] | $H_2O$ |
| Ex. 1 | 100 | — | 90.9 | 8.65 | 0.45 |
| Ex. 2 | 100 | — | 66.7 | 31.6 | 1.7 |
| Ex. 3 | 100 | 0.15 | 41.7 | 55.3 | 3.0 |
| Ex. 4 | 100 | 0.15 | 46.1 | 51.1 | 2.8 |
| Ex. 5 | 100 | 0.15 | 44.4 | 52.8 | 2.8 |
| Ex. 6 | 100 | 0.15 | 46.4 | 50.8 | 2.8 |
| Comp. Ex. A* | 100 | — | 100 | — | — |
| Comp. Ex. B* | 100 | 0.15 | 41.7 | 58.3 | — |
| Comp. Ex. C* | 100 | 0.10 | 46.1 | 53.9 | — |
| Comp. Ex. D* | 100 | 0.15 | 42.8 | 57.2 | — |

*Not an example of the present invention
[1]PS is a polystyrene resin having a molecular of approximately 200,000.
[2]The nucleating agent is talc
[3]EtOH is ethanol of 99.9% purity
[4]pph is parts per hundred, based on the total weight of the polymer

TABLE II

| | SMALL CELL FOAM PROPERTIES | | | | | | | | | |
|---|---|---|---|---|---|---|---|---|---|---|
| | Fresh Foam Properties | | Cured Foam Properties | | | | | | | |
| Example/ Properties | Density $(kg/m^3)$ | Cell Size (mm) V | Density $(kg/m^3)$ | Cell Size[1] (mm) | | | Compressive Strength $(kg/m^3)$ | | | Skin Quality/ Surface Appearance[6] |
| | | | | V[3] | E[4] | H[5] | V | E | H | |
| Ex. 1 | 41.2 | 0.31 | 40.7 | 0.31 | 0.17 | 0.29 | 525 | 210 | 251 | Good |
| Ex. 2 | 34.1 | 0.42 | 33.2 | 0.37 | 0.34 | 0.40 | 389 | 218 | 213 | Good |
| Ex. 3 | 36.2 | 0.33 | 35.9 | 0.33 | 0.24 | 0.35 | 399 | 225 | 237 | Excellent |
| Ex. 4 | 37.6 | 0.35 | 37.3 | 0.40 | 0.35 | 0.43 | 450 | 253 | 264 | Good |
| Ex. 5 | 34.5 | 0.34 | 34.0 | 0.45 | 0.33 | 0.56 | 350 | 146 | 236 | Excellent |
| Ex. 6 | 33.9 | 0.37 | 33.7 | 0.47 | 0.35 | 0.47 | 372 | 207 | 244 | Excellent |
| Comp. Ex. A* | 44.5 | 0.20 | 43.6 | 0.18 | 0.18 | 0.16 | 431 | 527 | 272 | Poor |
| Comp. Ex. B* | 40.7 | 0.32 | 40.4 | 0.40 | 0.33 | 0.49 | 290 | 397 | 413 | Good |
| Comp. Ex. C* | 42.8 | 0.36 | 42.5 | 0.43 | 0.34 | 0.47 | 416 | 431 | 416 | Fair |
| Comp. Ex. D* | 37.2 | 0.33 | 37.1 | 0.35 | 0.26 | 0.39 | 555 | 204 | 213 | Fair |

Footnotes to Table II:
*Not an example of the present invention
[1]Cell size as measured by ASTM D3576-77
[2]Compressive strength as measured by ASTM 1621
[3]V is in vertical direction
[4]E is in extrusion direction
[5]H is in horizontal direction
[6]Skin Quality/Surface Appearance is visual evaluation based on the following criteria:
Excellent = Very smooth surface and no pinholes/spots
Good = Smooth surface and/or very small pinholes/spots
Fair = Reasonably smooth surface and/or small pinholes/spots
Poor = Rough surface and/or pinholes/spots As readily apparent from the data shown in Table II, the small cell foams of the present invention prepared using a blowing agent mixture of $CO_2$, ethanol and water exhibit improved skin quality and surface appearance. Further, a comparison of the foam prepared in Example 3 with the foam prepared in Comparative Example B, both prepared with the same amount of carbon dioxide in the blowing agent mixture, clearly shows that by incorporating water in the blowing agent mixture (Example 3) the foam not only exhibits an improved skin quality but also has a lower density than the foam prepared without the presence of water (Comp. Ex. B).

EXAMPLES 7 and 8

Large cell styrene polymer foams are prepared with varying amounts of water in the blowing agent mixture in accordance with the present invention using the same procedure and type of equipment as described in Example 1. The large cell foam is discharged from the slot die at a rate of about 90.7 kg/h (200 pounds per hour). The compositions of each foam sample and the respective blowing agent proportions are set forth in Table III. The results of the large cell foam evaluation are given in Table IV below.

COMPARATIVE EXAMPLES E and F

Foam Samples E and F are prepared following the procedure of Example 7, except the alcohol or water component was omitted. The other components of the blowing agent mixture are indicated in Table III below. The results of the foam evaluation are given in Table IV below.

TABLE III

LARGE CELL FOAMS

| Example/Polymer Composition | PS[1], parts | Nucleating Agent[2], pph[4] | Blowing Agents, (weight percent) | | |
|---|---|---|---|---|---|
| | | | $CO_2$ | EtOH[3] | $H_2O$ |
| Ex. 7 | 100 | 0.05 | 26 | 53 | 21 |
| Ex. 8 | 100 | 0.05 | 43 | 22 | 35 |
| Comp. Ex. E* | 100 | 0.05 | 56 | — | 44 |
| Comp. Ex. F* | 100 | 0.05 | 33 | 67 | — |

*Not an example of the present invention
[1] PS is a polystyrene resin having a molecular of approximately 200,000.
[2] The nucleating agent is calcium stearate
[3] EtOH is ethanol of 99.9% purity
[4] pph = parts per hundred

TABLE IV

LARGE CELL FOAM PROPERTIES

| Example/ Properties | Fresh Foam Density (kg/m³) | Cured Foam Properties | |
|---|---|---|---|
| | | Average Cell Size (mm) | Open cells % |
| Ex. 7 | 30.6 | 2.5 | 0 |
| Ex. 8 | 30.6 | 2.4 | 0 |
| Comp. Ex. E* | 30.8 | 1.4 | 0 |
| Comp. Ex. F* | 30.9 | 1.3 | 0 |

*Not an example of the present invention

The data in Table IV shows that the cell size of foams prepared using a blowing agent mixture according to the present invention (Examples 7 and 8) can be increased by 70 percent or more compared to the foams prepared in Comp. Ex. E and F where either ethanol or water was omitted from the blowing agent mixture.

What is claimed is:

1. A process for preparing a low density closed cell foam comprising a plurality of closed cells having an average cell size of at least about 0.1 millimeter, the process comprising the steps of heat plastifying an alkenyl aromatic thermoplastic material; mixing from about 3 to about 10 weight percent, based on the total weight of the polymer, of a halogen-free blowing agent mixture of from about 15 to about 95 weight percent of carbon dioxide, from about 3 to about 80 weight percent of a lower alcohol and from about 0.4 to about 45 weight percent of water, based on the total weight of the total blowing agent mixture with the alkenyl aromatic thermoplastic material; reducing the pressure on the mixture to form a foam.

2. Process of claim 1 wherein the lower alcohol is ethanol.

3. Process of claim 2 wherein the foam has a cell size is from about 0.1 to about 1.2 millimeters and the blowing agent mixture is from about 15 to about 95 weight percent of carbon dioxide, from about 3 to about 80 weight percent of ethanol and from about 0.4 to about 20 weight percent of water, based on the total weight of the polymer.

4. Process of claim 3 wherein the blowing agent mixture is from about 30 to about 90 weight percent of carbon dioxide, from about 6 to about 60 weight percent of ethanol and from about 0.4 to about 10 weight percent of water, based on the total weight of the polymer.

5. Process of claim 2 wherein the foam has a cell size is from about 0.1 to 0.9 millimeters and the blowing agent mixture is from about 40 to about 70 weight percent of carbon dioxide, from about 6 to about 60 weight percent of ethanol and from about 0.4 to about 3 weight percent of water, based on the total weight of the polymer.

6. Process of claim 2 wherein the foam has a cell size is from greater than 1.2 to about 3.0 millimeters and the blowing agent mixture is from about 15 to about 50 weight percent of carbon dioxide, from about 10 to about 80 weight percent of ethanol and from about 10 to about 45 weight percent of water, based on the total weight of the polymer.

7. Process of claim 3 wherein the blowing agent mixture is from about 26 to about 43 weight percent of carbon dioxide, from about 22 to about 53 weight percent of ethanol and from about 21 to about 35 weight percent of water, based on the total weight of the polymer.

8. Process of claim 3 wherein the foam has a cell size is from about 1.5 to about 2.6 millimeters and the blowing agent mixture is from about 26 to about 43 weight percent of carbon dioxide, from about 22 to about 53 weight percent of ethanol and from about 21 to about 35 weight percent of water, based on the total weight of the polymer.

* * * * *